Dec. 28, 1965 A. HUET 3,225,423
JUNCTION PIECES FOR TUBE ELEMENTS
Filed Jan. 5, 1962 2 Sheets-Sheet 1
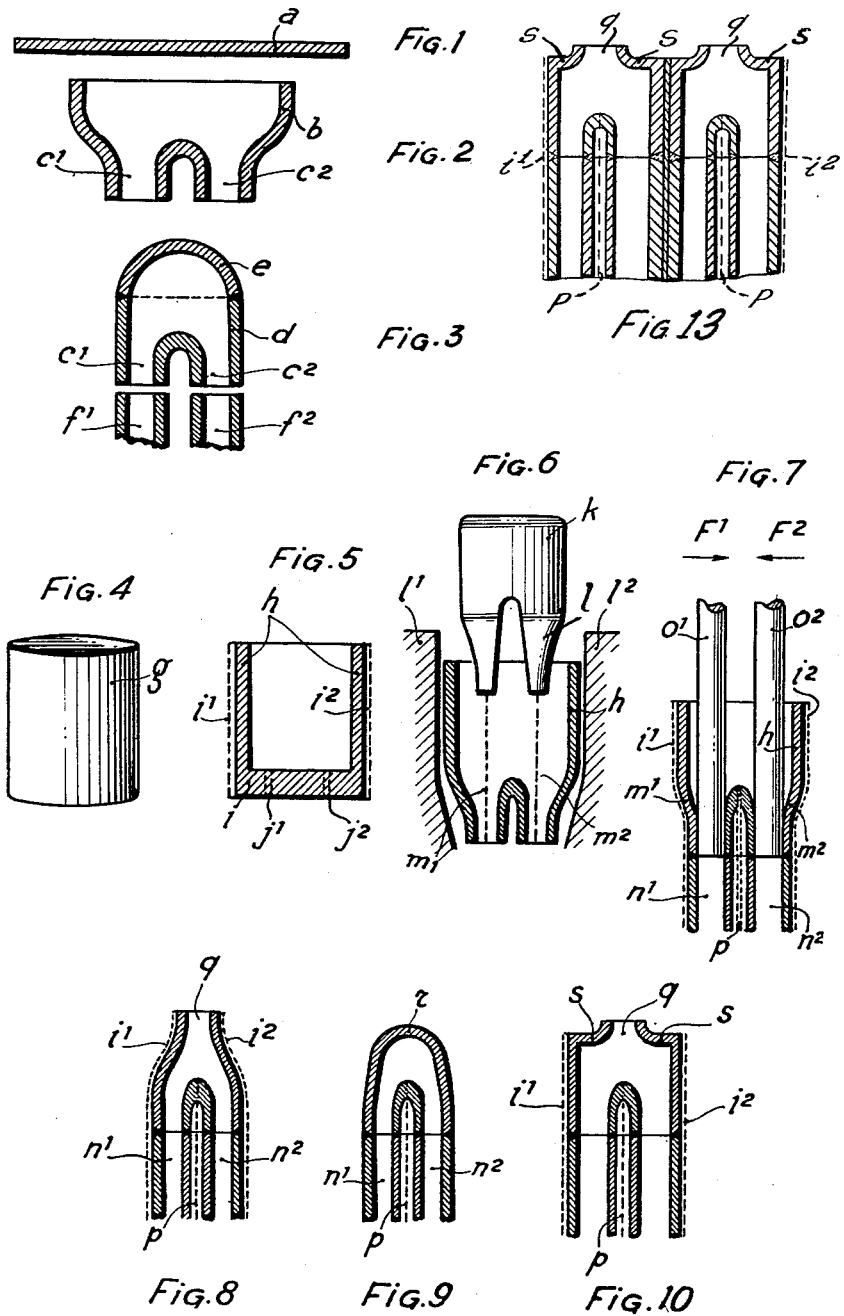

3,225,423
Patented Dec. 28, 1965

3,225,423
JUNCTION PIECES FOR TUBE ELEMENTS
André Huet, 48 Ave. du President Wilson, Paris, France
Filed Jan. 5, 1962, Ser. No. 164,578
Claims priority, application France, Jan. 19, 1961,
850,090
3 Claims. (Cl. 29—157)

The present invention has for its object a method of manufacturing a junction piece or breeches pipe comprising tubulures or necks for assembling tubes and which permits of connecting two or more parallel tubes by means of a bend, or again the bend may comprise an opening opposite the necks to which the parallel tubes will be welded, so as to form what is known as a neck bend, which enables the parallel tubes to be connected with another tube connected to the neck of the bend.

In a first embodiment, the junction piece or bend is obtained by punching and stamping a metal blank, the edges of which are turned up.

In a second embodiment, the punching enabling the tubulures or necks to be obtained is effected at the base of a hollow cylinder obtained by forging or machining a steel billet, the punch used for forming necks in the base of the cylinder comprising as many fingers as there are necks to be formed. The wall of the cylinder is then shaped to form a neck opposite the first necks formed in the base so as to form finally the part known as a "neck bend." The shaping may also be carried as far as complete closure, without any neck being left, or again be replaced by the welding on of a cap or head, if it is desired to obtain an ordinary bend.

It is provided that, during these operations, ribs can be caused to form on the outer surface of the cylinder treated and on the sides of the necks, which ribs will enable a plurality of bends manufactured in accordance with the invention to be welded together side by side. Tubes themselves comprising small longitudinal ribs may be welded to the ribbed necks so as to permit, for example, the formation of a tight wall of parallel tubes, that is to say without any gap between the tubes, by welding the ribs together in continuous fashion. Finally, it is also possible to cause the formation of simple reinforcing ribs on the cylinder treated, so as to obtain a reinforced bend.

The description which follows, with reference to the accompanying drawings given by way of example, will make it better understood how the invention can be carried into effect.

FIGS. 1 to 3 relate to a first embodiment; FIG. 1 shows in section the initial blank; FIG. 2 shows the stamped blank comprising two tubulures or necks; and FIG. 3 shows the final bend enabling two parallel tubes to be connected;

FIGS. 4 to 10 relate to a second embodiment;

FIG. 4 shows the initial billet in perspective;

FIG. 5 shows in the vertical section the billet machined or forged so as to form a hollow cylinder with a solid base;

FIG. 6 illustrates in vertical section the punching of the base of the cylinder;

FIG. 7 illustrates in vertical section the following operation, consisting in bringing the necks obtained in the base of the cylinder together;

FIG. 8 shows the part illustrated in FIG. 7 after shaping for the purpose of obtaining a bend comprising a neck;

FIG. 9 shows the part illustrated in FIG. 8 after complete shaping and closed by welding;

FIG. 10 illustrates a modified constructional form in which the neck bend has rectangular shoulders;

FIG. 13 is a section view of a plurality of breeches members joined according to the invention.

Figure 11:
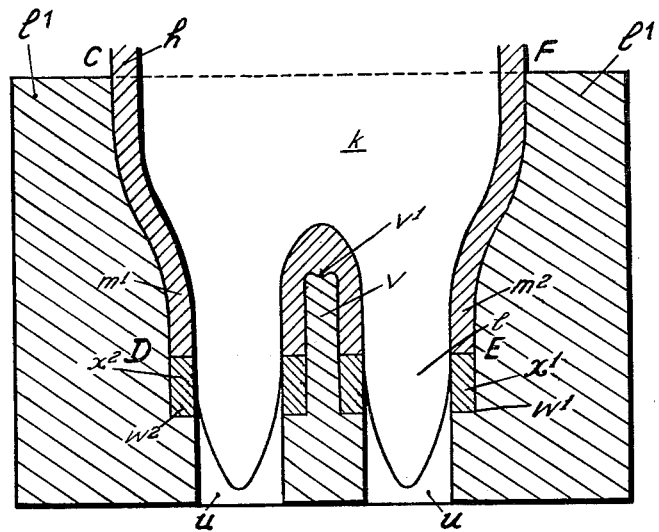
FIG. 11 illustrates in section on a larger scale the die which can be used.

In the first embodiment (FIGS. 1 to 3), a start is made from steel blank $a$, in the form of a disc, and by means of a punch comprising as many fingers as tubulures or necks which it is desired to form this blank is stamped in a die and, in the case of two necks $c^1$, $c^2$, assumes the form $b$ shown in FIG. 2. The sides of the cup are turned up so as to assume the cylindrical form $d$ shown in FIG. 3. The bend may be closed by a cap or head $e$ of semi-ovoid shape, so as to form a pipe or tube bend enabling two tubes $f^1$, $f^2$ to be connected with the two necks $c^1$, $c^2$.

In the second preferred embodiment, a start is made from a steel billet $g$ shown in FIG. 4 and this billet is forged or machined in such manner as to obtain a hollow cylinder $h$ with a solid base (FIG. 5). Small passages $j^1$, $j^2$ are formed in this base at the places where it is desired to obtain the necks. During the operation of forging or machining the billet, it is possible, if required, to form small lateral ribs $i^1$, $i^2$ on the sides of the cylinder, these ribs being shown in broken lines in FIG. 5.

The part having been brought to the required temperature, a punch $k$ carrying as many fingers $l$ as there are necks to be formed in the base $i$ is inserted in the cylinder, which is moreover held between dies $l^1$, $l^2$ of suitable shape. The fingers $l$ of the punch $k$, which are engaged in the holes $j^1$, $j^2$, then form necks $m^1$, $m^2$, the number thereof being two for example, in the base of the cylinder. During this operation, recesses provided if required in the dies $l^1$, $l^2$ enable small ribs extending ribs $i^1$, $i^2$ shown in FIG. 5 to be obtained on the sides of the necks $m^1$, $m^2$.

The two tubes $n^1$, $n^2$ (FIG. 7) which it is desired to connect are then welded to the necks $m^1$, $m^2$. If the interval between the axes of the necks $m^1$, $m^2$ is considered to be too large, iron bars $o^1$, $o^2$ are then inserted, after deburring the inside of the tubes $n^1$, $n^2$ which have just been welded on, and the bars are brought nearer to one another in the direction of the arrows $F^1$, $F^2$ (FIG. 7), so as to reduce the interaxial interval between the tubes $n^1$, $n^2$ to the desired value. This interaxial interval may be such that small longitudinal ribs provided on the tubes $n^1$, $n^2$ come into contact and these ribs can then be welded to one another along the line $p$ shown in dashes (FIG. 7) to form a tight wall of tubes.

During the further operation illustrated in FIG. 8, the cylindrical portion $h$ is shaped so as to obtain the form shown in FIG. 8, which is that of a neck bend, that is to say a bend having an opening $q$ to which a tube or header can be connected. This shaping, if the final bend is not to have any ribs, can be obtained by means of a hammer. If it is necessary to be careful of ribs obtained on the portion $h$, the operation is carried out by compression between dies comprising recesses in which the ribs $i^1$, $i^2$, shown in broken lines in FIG. 8, will be housed.

If it is desired to obtain a simple tube bend without any neck, the shaping is carried to the point of complete closure and finished off by welding at $r$, as will be seen in FIG. 9.

In a modified constructional form, the forging of the wall $h$ of the cylinder can be performed in such manner as to obtain finally a neck bend having a rectangular section $s$, as will be seen in FIG. 10. The small lateral ribs $i^1$, $i^2$ can then be extended as far as the shoulders $s$ of the neck bend and enable said neck bend to be welded as far as the shoulders to form a tight wall of tubes from the upper header to the lower header as shown in FIG. 13.

Instead of shaping the cylinder $h$ as shown in FIG. 8 and 9, it is also possible to weld a semi-ovoid cap or head, which may be open if required, on to the upper edge of the cylinder $h$.

It is also provided that, during the forging operations, it is possible to produce along the bend ribs which are located not only on the plane of the axes of the tubes $n^1$, $n^2$, such as the ribs $i^1$, $i^2$, but also ribs located in a plane at right angles, which will then be reinforcing ribs.

If sufficient space is available inside the junction piece or elbow, it is provided that internal deflecting walls can be housed in this space, these walls enabling the flow of fluid entering or leaving the tubes $n^1$, $n^2$ to be directed towards the upper neck $q$.

As will be seen, the junction piece, or bend, enables two or more parallel tubes to be connected and to be joined if required to tubulures or necks provided on headers located at the ends of these tubes. The small ribs provided on the tubes, like the ribs provided on the elbows or bends comprising the necks, can then be welded edge to edge, so as to form a tight wall of tubes from the lower header to the upper header.

There has been described with reference to FIG. 6 the stage of manufacture of the junction piece in which a punch $k$, having two fingers $l$, is inserted in a cylinder $h$ which is moreover held in a die consisting of two parts $l^1$, $l^2$. The die shown in FIG. 6 is illustrated diagrammatically.

More precisely, this is formed of two parts $l^1$, $l^2$ which meet in the plane of symmetry A–B (FIG. 12) to receive the cylinder in which the necks are to be formed. As will be seen in FIG. 11 at C D E F, the interval contour of the dies $l^1$, $l^2$ is adapted to the external shape of the final part which it is desired to obtain. When the punch $k$ has been inserted in the dies $l^1$, $l^2$, compressing the cylinder $h$, the latter assumes the form of the contour C D E F as shown in FIG. 11.

In the bottom of the dies $l^1$, $l^2$, there are provided as many apertures, such as $u$, as necks which it is desired to form in the part $h$. As will be seen in FIG. 11, the fingers $l$ of the punch $k$ are engaged at the end of the movement in these apertures $u$.

During this operation, the base of the part $h$, compressed between the punch and the die, is drawn out and forms the two necks $m^1$, $m^2$.

The central portion contained between the necks $m^1$, $m^2$ is supported by a projection $v$ forming part of the dies $l^1$, $l^2$ and, as shown in FIG. 11, the top of the projection may have a slight hollow $v^1$ to prevent the metal flowing excessively into the parts of the necks $m^1$, $m^2$ disposed opposite one another on both sides of the projection $v$ and in this way keep a sufficient thickness of metal in the crotch of the necks.

It will be seen that recesses or steps are formed at $w^1$, $w^2$ in the die around the orifices $u$, so as to permit the introduction of rings, such as $x^1$, $x^2$ shown in cross-ruled lines in FIG. 11 and which have the effect of limiting the depth to which the necks $m^1$, $m^2$ project. In this way, it is possible to obtain at will necks of different depths according to the height which is adopted for these rings $x^1$, $x^2$. These rings may even have at the top a conical portion which will enable a chamfered edge to be obtained by the working operation on the end of the necks, which can then be welded directly to the tubes which are to be connected to them.

Figure 12:
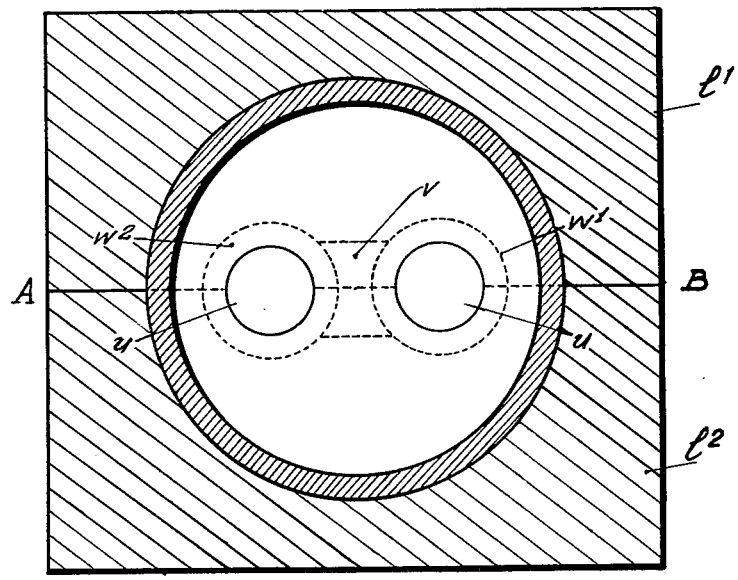
FIG. 12 is a plan view, partly in section, of the die shown in FIG. 11.

The shape of the final part $h$ shown in FIG. 12 has a circular cross-section, which is particularly advisable when it is desired to obtain four necks in the part $h$. Where it is a question of manufacturing aligned tubulures or necks, the cylinder $h$ may be ovalised before the operation of extruding the necks or even thereafter. The dies $l^1$, $l^2$ then have a corresponding shape, in order to obtain a junction piece of flattened or ovalised section.

It is obvious that it would be possible to make modifications of detail in the invention without departing from the scope thereof.

I claim:

1. A method of forging a breeches member for joining a tube to a plurality of parallel tubes comprising, providing a steel cylinder having one end open and a bottom thicker than the side walls thereof, said bottom having a plurality of spaced holes, said side walls defining a conduit, heating said steel cylinder to a forging temperature, holding said cylinder in a heated condition in a die confining said side walls circumferentially and axially and having a bottom provided with bottom apertures of greater diameter than said holes and in registry with said holes in said cylinder, forging a plurality of tubular extensions on said cylinder bottom by inserting axially into said cylinder a piercing die to compact and to shape said side walls on said dies and having parallel multiple punches axially inserted into said cylinder holes thereby to forge a plurality of spaced, parallel, tubular extensions on said cylinder bottom for connecting a plurality of parallel tubes thereto, the side walls of said cylinder defining said conduit as a single coupling conduit end portion having walls of substantially equal thickness and of compacted, grain-oriented material and disposed opposite to said tubular extensions and in communication therewith, and removing the formed breeches member from the dies.

2. A method of forging a breeches member for joining a tube to a plurality of parallel tubes comprising, providing a steel cylinder having one end open and a bottom thicker than the side walls thereof having external angularly spaced axial sides thereon, said bottom having a plurality of spaced holes, said side walls defining a conduit, heating said steel cylinder to a forging temperature, holding said cylinder including said axial ribs in a heated condition in a die confining said side walls circumferentially and axially and having a bottom provided with bottom apertures of greater diameter than said holes and in registry with said holes in said cylinder, forging a plurality of tubular extensions on said cylinder bottom by inserting axially into said cylinder a piercing die to compact and to shape said side walls on said dies and having parallel multiple punches axially inserted into said cylinder holes thereby to forge a plurality of spaced, parallel, tubular extensions on said cylinder bottom while still preserving said ribs and corresponding in inner and outer diameters to a plurality of parallel tubes to be coupled thereto and the side walls of said cylinder defining said conduit as a single coupling conduit end portion having walls of substantially equal thickness and of compacted, grain-oriented material and disposed opposite to said tubular extensions and in communication therewith, and removing the formed breeches member from the dies.

3. A method according to claim 2, including forming a plurality of individual breeches members, joining said plurality of individual breeches members alongside each other with parallel tubes connected thereto by permanently joining them along corresponding axial ribs.

References Cited by the Examiner

UNITED STATES PATENTS

| | | | |
|---|---|---|---|
| 361,509 | 4/1887 | Hambay | 29—157 X |
| 1,908,198 | 5/1933 | Trainer | 29—157.6 X |
| 1,924,891 | 8/1933 | True | 29—157.6 |
| 2,724,891 | 11/1955 | Huet | 29—534 X |
| 2,861,335 | 11/1958 | Huet | 153—21 X |
| 2,998,640 | 9/1961 | Huet | 29—157.6 X |
| 3,064,707 | 11/1962 | Walts | 153—21 X |

FOREIGN PATENTS

| | | |
|---|---|---|
| 88,322 | 5/1922 | Austria. |
| 184,674 | 8/1936 | Switzerland. |

JOHN F. CAMPBELL, *Primary Examiner.*

HYLAND BIZOT, WHITMORE A. WILTZ, *Examiners.*